(12) United States Patent
Jounay et al.

(10) Patent No.: US 8,804,749 B2
(45) Date of Patent: Aug. 12, 2014

(54) MECHANISM FOR UPDATING PARAMETERS OF A SESSION SET UP THROUGH A VIRTUAL CIRCUIT

(75) Inventors: Frédéric Jounay, Pieumeur Bodou (FR); Jean-Louis Le Roux, Lannion (FR)

(73) Assignee: Orange, Paris (FR)

( * ) Notice: Subject to any disclaimer, the term of this patent is extended or adjusted under 35 U.S.C. 154(b) by 363 days.

(21) Appl. No.: 12/988,896

(22) PCT Filed: Apr. 20, 2009

(86) PCT No.: PCT/FR2009/050729
§ 371 (c)(1),
(2), (4) Date: Oct. 21, 2010

(87) PCT Pub. No.: WO2009/138650
PCT Pub. Date: Nov. 19, 2009

(65) Prior Publication Data
US 2011/0040885 A1 Feb. 17, 2011

(30) Foreign Application Priority Data
Apr. 24, 2008 (FR) .................................... 08 52765

(51) Int. Cl.
*H04L 12/56* (2006.01)
*H04L 12/66* (2006.01)
*H04W 74/08* (2009.01)

(52) U.S. Cl.
CPC ............... *H04L 47/10* (2013.01); *H04L 12/66* (2013.01); *H04W 74/08* (2013.01)
USPC ........... 370/401; 370/400; 370/462; 370/235; 709/225

(58) Field of Classification Search
USPC ......... 370/401, 400, 410, 522, 462, 235, 237, 370/236, 395.2, 395.21; 709/225
See application file for complete search history.

(56) References Cited

U.S. PATENT DOCUMENTS

| | | | |
|---|---|---|---|
| 7,417,950 B2 * | 8/2008 | Hofmeister et al. | 370/230 |
| 2007/0008982 A1 * | 1/2007 | Voit et al. | 370/401 |
| 2008/0253367 A1 * | 10/2008 | Ould-Brahim | 370/389 |

OTHER PUBLICATIONS

Manni et al., "GMPLS LSP Bandwidth Modification (LBM) for SONET/SDH; draft-mannie-ccamp-gmpls-lbm-tdm-04.txt," IETF Standard-Working-Draft, Internet Engineering Task Force, IETF, CH, No. 4, pp. 1-17 (Nov. 1, 2002).

(Continued)

*Primary Examiner* — Ian N Moore
*Assistant Examiner* — Hien Nguyen
(74) *Attorney, Agent, or Firm* — Drinker Biddle & Reath LLP (57) ABSTRACT

A method of communicating through a pseudo-wire set up between first and second provider edge nodes of a packet-switched network through at least one router of the packet-switched network, said method comprising, during a phase of transmitting data through the pseudo-wire in accordance with parameters defining a first communication session set up between the first and second provider edge nodes steps of: the second provider edge node receiving a set up message a of second communication session between the first and second provider edge nodes, the setting up message comprising parameters defining the second session, and the second equipment sending the router a notification message comprising parameters defining the second session and indicating switching of data transmission to the second communication session, the phase of transmitting data continuing in accordance with the parameters defining the second communication session.

7 Claims, 5 Drawing Sheets

(56) References Cited

OTHER PUBLICATIONS

Martini et al., "Dynamic Placement of Multi Segment Pseudo Wires; draft-ietf-pwe3-dynamic-ms-pw-o6.txt," IETF Standard-Working-Draft, Internet Engineering Task Force, IETF, CH, vol. pwe3, No. 6, pp. 1-21 (Nov. 1, 2007).

Muley et al., "Preferential Forwarding Status Bit Definition; draft-ietf-pwe3-redundancy-bit-00.txt," IETF Standard-Working-Draft, Internet Engineering Task Force, IETF, CH, vol. pwe3, pp. 1-28 (Feb. 25, 2008).

* cited by examiner

| SAII 1 | TAII2 | up Date | Param pw | LBL 10 |

Fig. 6A

| SAII 1 | TAII2 | up Date | Param pw | LBL 11 |

Fig. 6B

| SAII 1 | TAII2 | Param pw | Switching | LBL 11 |

Fig. 6C

| SAII 1 | TAII2 | Param pw | Switching | LBL 10 |

MECHANISM FOR UPDATING PARAMETERS OF A SESSION SET UP THROUGH A VIRTUAL CIRCUIT

CROSS-REFERENCE TO RELATED APPLICATIONS

This application is the U.S. national phase of the International Patent Application No. PCT/FR2009/050729 filed Apr. 20, 2009, which claims the benefit of French Application No. 08 52765 filed Apr. 24, 2008, the entire content of which is incorporated herein by reference.

FIELD OF THE INVENTION

The field of the invention is telecommunications, more particularly packet-switched networks.

BACKGROUND

The data transmitted in a packet-switched network (PSN) takes the form of packets processed by switches of the network until they reach their destination. The set of packets transmitted constitutes a data stream.

One technology used to route data packets in packet-switched networks is the multi-protocol label switching (MPLS) technology, which adds to the headers of the data packets one or more labels containing information enabling the routers of the network to determine the next hop that a packet must execute to reach its destination. The MPLS technology is described in more detail in Request For Comments RFC 3031 of the Internet Engineering Task Force (IETF), which is an Internet standardization group.

However, the MPLS protocol can be used to process only packets conforming to the Internet Protocol (IP).

To alleviate this drawback, the virtual circuit concept defined by the IETF PseudoWire Emulation Edge to Edge (PWE3) standardization group enables emulation of a point-to-point connection between two packet-switched network equipments using the IP/MPLS technology. These virtual circuits are also known as pseudo-wires and are defined in the document RFC 3985, and they make it possible to transmit data packets that do not conform to the Internet Protocol, for example data packets conforming to the ATM protocol.

Figure 1:
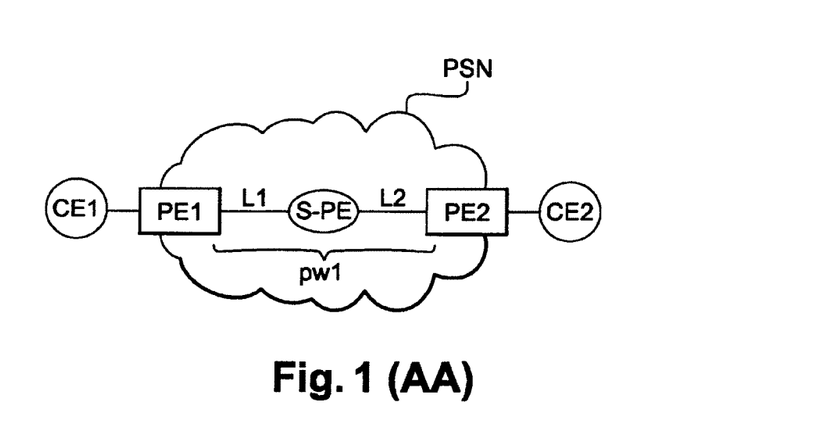
FIG. 1, already described with reference to the prior art, represents a pseudo-wire set up as in the prior art between first and second provider edge nodes of a packet-switched network.

Referring to FIG. 1, a multi-segment pseudo-wire pw1 is set up between a first provider edge node PE1 at the edge of a packet-switched network PSN and a second provider edge node PE2 also at the edge of the PSN. Once the pseudo-wire pw1 has been set up, the first provider edge node PE1 sends a data stream transmitted over the pseudo-wire pw1 to the second provider edge node PE2. The provider edge nodes PE1 and PE2 are routers, Ethernet routers or PW nodes, for example.

The data constituting the data stream sent by the provider edge node PE1 is generated by a first client equipment node CE1 connected to the provider edge node PE1.

The data constituting the data stream received by the provider edge node PE2 is processed by a second client equipment node CE2 connected to the provider edge node PE2.

The provider edge node PE2 encapsulates the data generated by the client equipment node CE2 with a predetermined format. One such format is the data volume, for example. The term data volume refers to the size of the blocks into which the data may be divided, for example blocks of 15 payload bits, or a fixed number of ATM cells that the equipment PE1 is able to receive. The provider edge node PE2 is configured to encapsulate the data according to this predetermined format.

The provider edge node PE1 is also configured to receive data conforming to the predetermined format with which it was encapsulated by the provider edge node PE2.

The pseudo-wire PW1 for transmitting data from the provider edge node PE2 to the provider edge node PE1 is set up at the initiative of the provider edge node PE1 and relies on the exchange of set-up messages conforming to the label distribution protocol (LDP) as defined in the documents RFC 3036 and RFC 4477. Accordingly, a first pseudo-wire set-up message is sent by the provider edge node PE1 to a router S-PE of the network PSN to set up a first link L1 of the pseudo-wire pw1. This first set-up message includes an identifier SAII1 of the source provider edge node PE1, an identifier TAII2 of the terminating provider edge node PE2, parameters of the pseudo-wire, and a first label that is added to the header of all the data sent by the router S-PE to the provider edge node PE1 through the first link of the pseudo-wire pw1.

A second link L2 of the pseudo-wire pw1 is set up between the router S-PE and the second provider edge node PE2. The router S-PE sends the second provider edge node PE2 a second set-up message that includes an identifier SAII1 of the provider edge node PE1, an identifier TAII2 of the provider edge node PE2, parameters of the pseudo-wire, and a second label that is added to the header of all the data sent by the second provider edge node PE2 to the router S-PE through the second link of the pseudo-wire pw1.

On reception of the pseudo-wire set-up message, the provider edge node PE2 sends the router S-PE a third pseudo-wire set-up message including an identifier SAII2 of the provider edge node PE2, an identifier TAII1 of the provider edge node PE1, parameters of the pseudo-wire, and a third label that is added to the header of all the data sent by the router S-PE to the provider edge node PE2 through the second link of the pseudo-wire pw1.

The router S-PE sends the first provider edge node PE1 a fourth pseudo-wire set-up message including an identifier SAII2 of the provider edge node PE2, an identifier TAII1 of the provider edge node PE1, parameters of the pseudo-wire, and a fourth label that is added to the header of all the data sent by the first provider edge node PE1 to the router S-PE through the first link of the pseudo-wire pw1.

Once the pseudo-wire pw1 has been set up between the provider edge node PE1 and the provider edge node PE2, it transmits data bidirectionally between the provider edge node PE1 and the provider edge node PE2. Pseudo-wires such as the pseudo-wire pw1 are defined in detail in the document "An Architecture for Multi-Segment Pseudo-Wire Emulation Edge-to-Edge (draft-ietf-pwe3-ms-pw-arch-02.txt)".

In this instance, the client equipment node CE1 connected to the provider edge node PE1 is adapted to process data generated by the client equipment node CE2 connected to the provider edge node PE2.

The pairs {provider edge node PE1 identifier SAII1/provider edge node PE2 identifier TAII2} and {provider edge node PE2 identifier SAII2/provider edge node PE1 identifier TAII1} constitute two forwarding equivalence classes (FEC) each of which defines one transmission direction of the same pseudo-wire pw1.

To increase the bit rate of a pseudo-wire, the telecommunication provider managing the PSN has to modify the format of the data transmitted through the pseudo-wire pw1. Two solutions are available for this.

A first solution consists in destroying the pseudo-wire pw1 and setting up a new pseudo-wire adapted to transmit data conforming to the new format.

Figure 2:
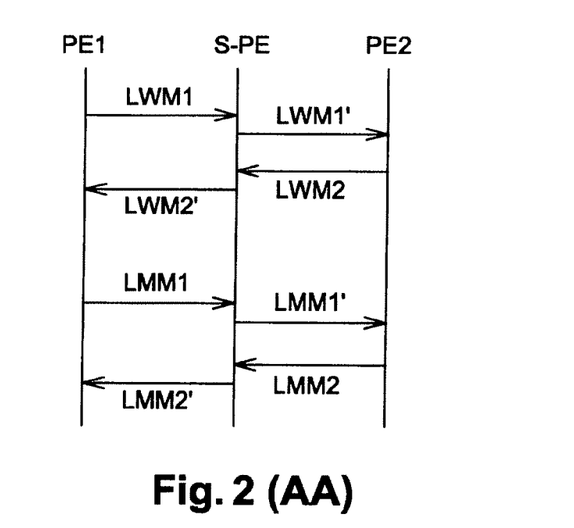
FIG. 2, also already described with reference to the prior art, is a timing diagram of requests exchanged in a first prior art solution between first and second provider edge nodes of a packet-switched network in order to destroy a first pseudo-wire set up between the two provider edge nodes and to set up a second pseudo-wire.

FIG. 2 is a diagram representing the exchange of messages between the provider edge node PE1, the router S-PE, and the provider edge node PE2 when this solution is used.

When the data format is changed in the first client equipment node CE1, said equipment informs the provider edge node PE1 of this. The provider edge node PE1 then sends the router S-PE a message LWM1 requesting release of the resources used by the first link L1 of the pseudo-wire pw1 in the uplink direction, i.e. from the router S-PE to the provider edge node PE1. On reception of this message LWM1, the router in turn sends the provider edge node PE2 a message LWM1' requesting release of the resources used by the second link L2 of the pseudo-wire pw1 in the uplink direction, i.e. from the provider edge node PE2 to the router S-PE.

On reception of the message LWM1', the provider edge node PE2 in turn sends the router S-PE a message LWM2 requesting release of the resources used by the second link L2 of the pseudo-wire pw1 in the downlink direction, i.e. from the router S-PE to the second provider edge node PE2. On reception of this message LWM2, the router S-PE in turn sends the provider edge node PE1 a message LWM2' requesting release of the resources used by the first link L1 of the pseudo-wire pw1 in the downlink direction, i.e. from the provider edge node PE1 to the router S-PE.

On reception of the message LWM2', the provider edge node PE1 sends the router S-PE a first message LMM1 to set up a new pseudo-wire. On reception of the set-up message LMM1, the router in turn sends the provider edge node PE2 a second set-up message LMM1'.

On reception of the message LMM1', the provider edge node PE2 sends a third set-up message LMM2 to the router S-PE. On reception of the set-up message LMM2, the router in turn sends the provider edge node PE1 a fourth set-up message LMM2'.

The set up messages LMM1, LMM1', and LMM2, LMM2' of the new pseudo-wire each include an FEC for identifying the new pseudo-wire and new parameters of the pseudo-wire, for the uplink direction in the messages LMM1 and LMM1' and for the downlink direction in the messages LMM2 and LMM2'. Accordingly, the new pseudo-wire set up is able to transmit data conforming to the new format for each transmission direction.

When it is implemented, a solution of the above kind requires interruption of the data packet traffic between the provider edge node PE1 and the provider edge node PE2. Depending on the nature of the data routed by the pseudo-wire, such interruption of the traffic degrades quality of service, especially if the data routed is real-time data.

Figure 3:
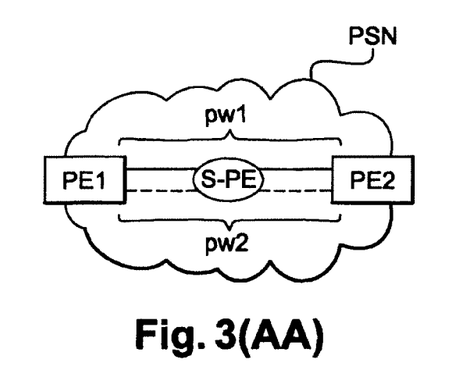
FIG. 3 represents two pseudo-wires set up in accordance with the second solution described with reference to the prior art.

A second solution, represented in FIG. 3, consists in setting up a second pseudo-wire pw2 between the provider edge node PE1 and the provider edge node PE2. The elements of this figure already described with reference to FIG. 1 carry the same references and are not described again.

The set up messages of the pseudo-wire pw2 in the uplink direction and in the downlink direction each include an FEC different from the corresponding FEC identifying the pseudo-wire pw1 and the new parameters of the new pseudo-wire pw2.

In this solution, a new pseudo-wire must be set up between the provider edge node PE1 and the provider edge node PE2 on each modification of the format of the data with a view to modifying the bit rate of a pseudo-wire.

Although making it possible to ensure continuity of service, such a solution has the drawback of being greedy for network resources, for example processing resources in the equipments (storage capacity, calculation capacity, etc.).

The solution proposed by the invention does not have the drawbacks of the prior art solutions.

SUMMARY

The solution of the invention relies on the use of a communications method through a pseudo-wire set up between a first and a second provider edge nodes of a packet-switched network through at least one router of the packet-switched network, said method including, during a phase of transmission of data through the pseudo-wire in accordance with parameters defining a first communication session set up between the first and second provider edge nodes:
  a step of the second provider edge node receiving a set up message of a second communication session through said pseudo-wire, the set-up message including parameters defining the second session; and
  a step of the second provider edge node sending the router a notification message including the parameters defining the second session, the transmission of data continuing through said pseudo-wire in accordance with the parameters defining the second communication session.

The solution of the invention sends a set up message of a new communication session between the first and second provider edge nodes, an active first communication session having been set up previously through the pseudo-wire. The new communication session is defined by new call parameters and, by extension, new labels used when transmitting data through the pseudo-wire. These parameters include a new data format used by a provider edge node constituting one end of the pseudo-wire to encapsulate data to be sent through the pseudo-wire, for example.

This kind of set up message of a new communication session is sent by a provider edge node constituting a first end of the pseudo-wire to another provider edge node constituting a second end of the pseudo-wire during a phase of transmitting data between the two provider edge nodes through the pseudo-wire in accordance with the parameters defining the first communication session.

Thus the solution of the invention is free of the drawbacks of the prior art. Using it does not require interruption of service because the set up message of a new communication session is sent while the pseudo-wire is able to transmit data.

Moreover, the solution of the invention does not require setting up a second pseudo-wire because the set up message of a new communication session is not a set up message of a new pseudo-wire. In a method of the invention, the identifier of the pseudo-wire (the FEC) always remains the same regardless of the communication session during which the data is transmitted through the pseudo-wire.

In the prior art, the pseudo-wire cannot be dissociated from the parameters of the communication session used to transmit the data through the pseudo-wire. This is why, to modify the transmission parameters, it is necessary either to destroy the pseudo-wire and to set up a new one adapted to transmit data in accordance with the parameters of the new communication session or to set up a second pseudo-wire between the first and second provider edge nodes and then destroy the first.

The method of the invention makes it possible to dissociate the pseudo-wire from the parameters of the communication session used to transmit the data through the pseudo-wire by an astute exchange of signaling messages.

The object of the second provider edge node sending the notification message to the router is to indicate that the transmission of data is being routed from the first communication session to the second communication session.

The solution of the invention makes it possible to modify the format of data transmitted through a pseudo-wire without changing the pseudo-wire, i.e. without changing the FECs of the pseudo-wire in the uplink or downlink direction, and without interrupting service. According to one feature of the communications method of the invention, the first provider edge node being downstream of the router and the second provider edge node being upstream thereof, after reception of the message including parameters defining the second session the router executes:

a step of sending an upstream neighbour equipment, or upstream equipment, a message requesting deletion of the parameters defining the first session; and a step of sending a downstream neighbour equipment, or downstream equipment, the notification message.

By transmitting the message containing the parameters defining the second communication session to a neighbour equipment on its downstream side, the router provides for propagating the information that transmission of the data is being routed from the first communication session to the second communication session.

Depending on the number of routers through which the pseudo-wire is set up, a router may have for its downstream neighbour equipment either another router or the first provider edge node.

The router also sends a message to request deletion of the parameters defining the first session to an upstream neighbour equipment that propagates this request through the pseudo-wire as far as the second provider edge node.

Depending on the number of routers through which the pseudo-wire is set up, a router may have for its downstream neighbour equipment either another router or the first provider edge node.

According to one feature of the communications method of the invention, the method includes on reception of the notification message by a downstream equipment a step of configuring a switching table of the downstream equipment after which the parameters defining the first session are deleted from the switching table.

On reception of the notification message, the parameters defining the first communication session and the label used in the first session are deleted from the memory of the switching table of the equipment.

According to one feature of the communications method of the invention, the method includes on reception by an upstream equipment of the message requesting deletion of the parameters defining the first session a step of configuring a switching table of the upstream equipment after which the parameters defining the first session are deleted from the switching table.

On reception of the message requesting deletion of the parameters defining the first session and the label used in that first session, these parameters are deleted in the switching table of the equipment. The parameters released in this way can be used to define another session if necessary.

The invention also provides a provider edge node for a packet-switched network, a pseudo-wire being set up between a first provider edge node of the packet-switched network and said provider edge node through at least one router of the packet-switched network, said provider edge node including means for transmitting data through the pseudo-wire in accordance with parameters defining a first communication session set up between the first provider edge node and the provider edge node, said provider edge node including:

means for receiving a set up message of a second communication session through said pseudo-wire, the set-up message including parameters defining the second session; and means for sending the router a notification message including the parameters defining the second session, the transmission of data continuing through said pseudo-wire in accordance with the parameters defining the second communication session.

The invention further provides a router of a packet-switched network through which a pseudo-wire is set up between a first provider edge node of a packet-switched network downstream of the router and a second provider edge node of the packet-switched network upstream thereof, data being transmitted through the pseudo-wire in accordance with parameters defining a first communication session set up between the first and second provider edge nodes, the router including:

means for receiving a notification message including the parameters defining a second session through said pseudo-wire, the transmission of data continuing through said pseudo-wire in accordance with the parameters defining the second communication session;

means for sending an upstream neighbour equipment, or upstream equipment, a message to request deletion of the parameters defining the first session; and means for sending a downstream neighbour equipment, or downstream equipment the notification message.

The invention further provides a computer program characterized in that it includes program code instructions for executing the steps of the method of the invention when the program is executed by a processor.

The invention further provides a first signal transmitted between first and second equipments of a packet-switched network through which a pseudo-wire is established, data being transmitted through the pseudo-wire during a transmission phase in accordance with parameters defining a first communication session.

The first signal carries a notification message including parameters defining a second session set up between a first and a second provider edge nodes between which the pseudo-wire is set up, the transmission of data continuing through said pseudo-wire in accordance with the parameters defining the second communication session, said signal being sent in response to another signal transmitted through the pseudo-wire and carrying a set up message of the second communication session including the parameters defining the second session.

The set-up message included in the second signal includes:
an identifier of said pseudo-wire;
a parameter indicating that it is a set up message of the second communication session;
a field including the parameters defining the second communication session; and
a label.

The invention further provides a method of communicating through a pseudo-wire set up between first and second provider edge nodes of a packet-switched network through at least one router of the packet-switchroutered network, said method including during a phase of transmitting data through the pseudo-wire in accordance with parameters defining a first communication session set up between the first and second provider edge nodes:

a step of the second provider edge node receiving a set up message of a second communication session between the first and second provider edge nodes, the setting up message including parameters defining the second session; and a step of the second equipment sending the router a notification message including parameters defining the second session and indicating switching of data transmission to the second communication session, the phase of transmitting data continuing in accordance with the parameters defining the second communication session.

Other features and advantages of the invention become apparent on reading the description of preferred embodiments given with reference to the drawings, in which:

DETAILED DESCRIPTION

Figure 4:
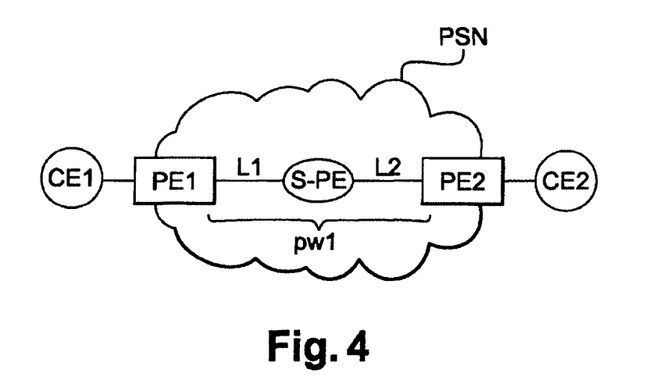
FIG. 4 represents a pseudo-wire set up between first and second provider edge nodes that use the communications method of the invention.

FIG. 4 represents a connection set up between a first provider edge node PE1 and a second provider edge node PE2, both of which are at the edge of a packet-switched network PSN.

Referring to the above figure, a pseudo-wire pw1 is set up between the first provider edge node PE1 and the second provider edge node PE2 through one or more provider edge routers S-PE. A pseudo-wire of this kind includes a first link L1 set up between the first provider edge node PE1 and a router S-PE and a second link L2 set up between the router S-PE and the second provider edge node PE2. Such a pseudo-wire pw1 is set up dynamically using T-LDP signaling as defined in the document "draft-ietf-pwe3-dynamic-ms-pw (PW routing table)".

The pseudo-wire pw1 set up in this way makes it possible to transmit data between the provider edge node PE1 and the provider edge node PE2, the data being switched from the first link L1 of the pseudo-wire pw1 to the second link L2 by the router S-PE. Data may be transmitted unidirectionally, i.e. from the provider edge node PE1 to the provider edge node PE2 or from the provider edge node PE2 to the provider edge node PE1, or bidirectionally, i.e. from the provider edge node PE2 to the provider edge node PE1, downlink transmission direction, and from the provider edge node PE1 to the provider edge node PE2, uplink transmission direction.

One example of an application of the invention is collecting mobile network traffic. In an example of this kind, a first client equipment node CE1 such as a base station is connected to the first provider edge node. The first provider edge node PE1 transmits data collected by the first client equipment node CE1 through the pseudo-wire pw1 to the provider edge node PE2 that is itself connected to other client equipment nodes CE2 such as a radio network controller (RNC). According to the invention, the pseudo-wire pw1 is set up at the initiative of the provider edge node PE1 by the first provider edge node PE1, the router S-PE, and the second provider edge node PE2 exchanging LDP set-up messages.

Accordingly, the provider edge node PE1 sends a first set-up message to the router S-PE, after which the router sends a second set-up message to the provider edge node PE2. These set-up messages include an identifier SAII1 of the provider edge node PE1, an identifier TAII2 of the provider edge node PE2, parameters defining a communication session set up through the pseudo-wire pw1, a first label LBL0 for the first message, and a second label LBL1 for the second message. This second label LBL1 must be added to the header of all data sent by the provider edge node PE2 to the router S-PE through the link L2 of the pseudo-wire pw1. The first label LBL0 must be added to the header of all data sent by the router S-PE to the first provider edge node PE1 through the link L1 of the pseudo-wire pw1.

The parameters defining the communication session are a function of the data format that the provider edge node PE1 is adapted to receive and process. The provider edge node PE1 processes data sent by the provider edge node PE2 through the pseudo-wire pw1 with a predetermined format and then transmits it to the client equipment node CE1. One example of such a format is the data volume. By data volume is meant the size of the blocks into which the data may be divided, for example blocks of 15 payload bits or a fixed number of ATM cells. The provider edge node PE1 is configured to encapsulate the data according to this predetermined format.

Other examples of parameters defining the communication session include the number of a virtual channel of an ATM cell, the number of ATM cells, and the number of time-division multiplex (TDM) time slots.

On reception of the set-up message, the provider edge node PE2 sends the provider edge node PE1 a third set-up message including an identifier SAII2 of the provider edge node PE2, an identifier TAII1 of the provider edge node PE1, parameters defining the communication session, and a third label. This third label is added to the header of all data sent by the router S-PE to the provider edge node PE2 through the pseudo-wire pw1. The router S-PE sends the provider edge node PE1 a fourth set-up message including an identifier SAII2 of the provider edge node PE2, an identifier TAII1 of the provider edge node PE1, parameters defining the communication session, and a fourth label. This fourth label is added to the header of all data sent by the provider edge node PE1 to the router S-PE through the pseudo-wire pw1.

The third and fourth set-up messages are sent only if the pseudo-wire pw1 set up between the provider edge nodes PE1 and PE2 is bidirectional.

Once set up between the provider edge node PE1 and the provider edge node PE2, the pseudo-wire pw1 transmits bidirectionally, during a data transmission phase PH1, data conforming to the parameters defining the communication session set up between the provider edge node PE1 and the provider edge node PE2.

The pairs {provider edge node PE1 identifier SAII1/provider edge node PE2 identifier TAII2} and {provider edge node PE2 identifier SAII2/provider edge node PE1 identifier TAII1} constitute two forwarding equivalence classes (FEC) each of which defines one transmission direction of the same pseudo-wire pw1.

Figure 5:
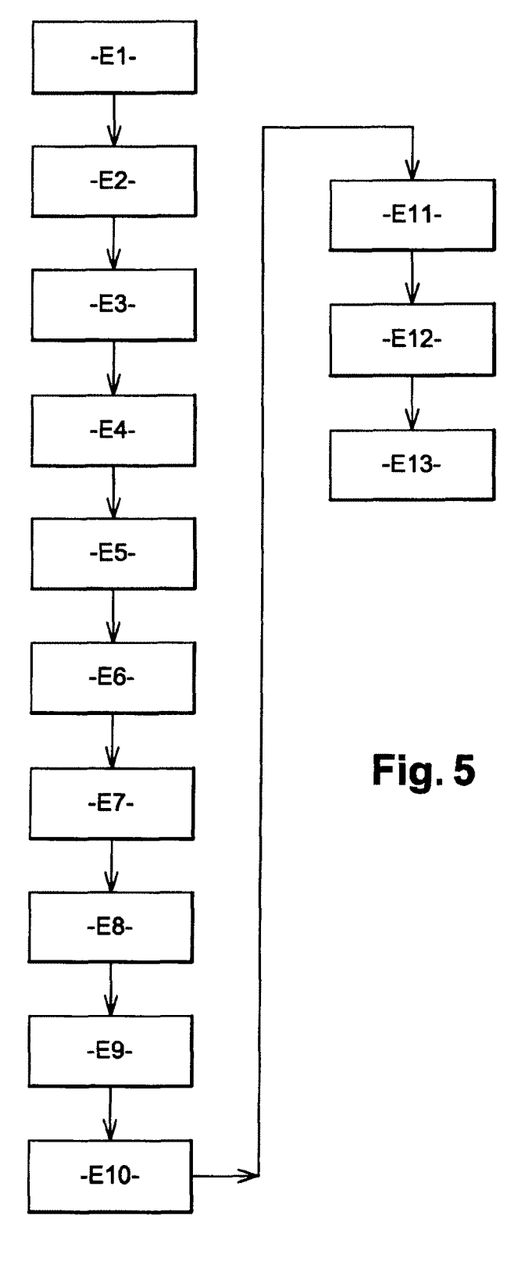
FIG. 5 represents the steps of the data communications method of the invention.

In order to increase the bit rate of the pseudo-wire pw1, it is necessary to modify the format of the data received by the first provider edge node PE1, and for this purpose to set up a second communication session between the first and second provider edge nodes PE1, PE2, the parameters defining the second session being different from the parameters defining the active communication session between the two provider edge nodes. To this end, the first provider edge node uses the communications method of the invention, of steps that are represented in FIG. 5.

The communications method is executed during a phase PH1 of transmitting data between the provider edge node PE1 and the provider edge node PE2 through the pseudo-wire pw1 in accordance with parameters defining a first active communication session between the first and second provider edge node. Signaling messages are exchanged during execution of the communications method in a control plane of the pseudo-wire pw1. These exchanges of signaling messages do not interrupt the transmission of data through the pseudo-wire pw1 since the data transmission is effected in a transfer plane of the pseudo-wire pw1.

Accordingly, during a step E1, the provider edge node PE1 sends the router S-PE a first message SIG1 to request setting up of a second communication session through the pseudo-wire pw1 to be used for the uplink direction.

Figure 6A:
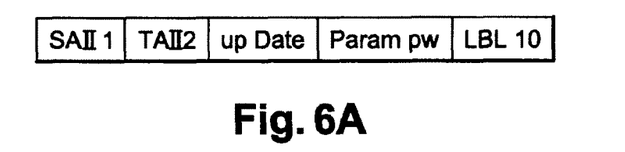
FIGS. 6A, 6B, 6C, and 6D represent signaling messages exchanged between packet-switched network equipments using the solution of the invention.

FIG. 6A represents one example of such a first message SIG1. This message includes an FEC {SAII1/TAII2} for identifying the downlink transmission direction of the pseudo-wire pw1, a field containing a parameter upDate indicating that the message SIG1 is a message requesting setting up of a second communication session, a field containing the parameters defining the second session to be set up and in accordance with which the data is to be transmitted, and a label LBL10 used for the uplink direction between the router and the first provider edge node PE1. The parameters defining the second communication session are for example the new format for encapsulating data sent to the provider edge node PE1.

During a step E2, the router S-PE stores in a switching table the parameters defining the second communication session and the label LBL10 used when transmitting data from the second provider edge node PE2 to the first provider edge node PE1 through the link L1 of the pseudo-wire pw1.

During a step E4, the router sends the second provider edge node PE2 a message SIG1' to request setting up a second communication session.

Figure 6B:
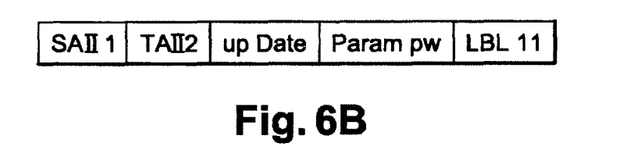

FIG. 6B represents the message SIG1'. This message includes the FEC (SAII1/TAII2) identifying the downlink transmission direction of the pseudo-wire pw1, the field containing the parameter upDate indicating that the message SIG1' is requesting setting up of the second communication session, the field containing the parameters defining the second session, and a label LBL11 used between the second provider edge node PE2 and the router S-PE.

Before this, during a step E3, the router S-PE stores in its switching table the parameters defining the second communication session and the label LBL11 used to transmit data from the second provider edge node PE2 to the first provider edge node PE1 through the link L2 of the pseudo-wire pw1.

During a step E5, the provider edge node PE2 receives the message SIG1' requesting to set up a second communication session.

Figure 6C:
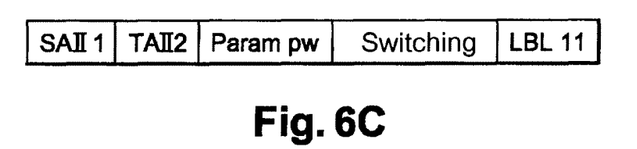

During a step E6, the second provider edge node PE2 sends the router a message SIG2 including an FEC (SAII1/TAII2) indicating transmission from the provider edge node PE2 to the router S-PE, a field containing the parameters defining the second communication session, a parameter "Switching", and the label LBL11. One such message SIG2 is represented in FIG. 6C. The presence of the parameter "Switching" in the message SIG2 indicates that the data transmission phase PH1 is to continue in accordance with the parameters defining the second communication session.

On reception of the message SIG2, the router S-PE deletes from its switching table, during a step E7, the label used to transmit data through the second link L2 of the pseudo-wire pw1 in accordance with the parameters defining the first communication session. At the end of this step E7, only the label LBL11 is stored in the switching table of the router S-PE. The message SIG2 takes the form of a Notification message as defined in RFC 5036.

During a step E8, the router S-PE sends the second provider edge node PE2 a message requesting deletion of the parameters defining the first session and, by extension, the label used to transmit data through the second link L2 of the pseudo-wire pw1 in accordance with the parameters defining the first communication session. A message of this kind takes the form of an LDP message Label withdraw. This message includes the FEC {SAII1/TAII2} indicating that transmission is effected from the provider edge node PE2 to the provider edge node PE1 and the label used to transmit data through the second link L2 of the pseudo-wire pw1 in accordance with the parameters defining the first communication session.

On reception of the message requesting deletion of the parameters defining the first session, the second provider edge node, during a step E9, deletes from its switching table the label used to transmit data through the second link L2 of the pseudo-wire pw1 in accordance with the parameters defining the first communication session.

Figure 6D:
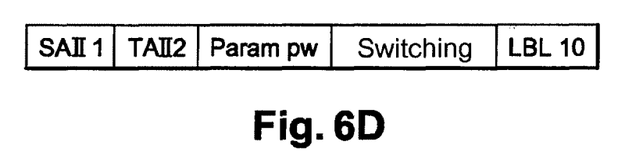

During a step E10, the router S-PE sends the first provider edge node a message SIG2' including an FEC {SAII1/TAII2} indicating that transmission is effected from the provider edge node PE2 to the provider edge node PE1, a field containing the parameters defining the second communication session, a "Switching" parameter, and the label LBL10. FIG. 6D represents a message SIG2' of this kind. The presence of the parameter "Switching" in the message SIG2' indicates that transmission of data during the data transmission phase PH1 is to continue in accordance with the parameters defining the second communication session.

On reception of the message SIG2', the provider edge node PE1 deletes from its switching table, during a step E11, the label used to transmit data through the first link L1 of the pseudo-wire pw1 in accordance with the parameters defining the first communication session. At the end of this step E11, only the label LBL10 is stored in the switching table of the provider edge node PE1.

During a step E12, the provider edge node PE1 sends the router S-PE a message requesting deletion of the parameters defining the first session.

On reception of the message requesting deletion of the parameters defining the first session, the router S-PE, during a step E13, deletes from its switching table the label used to transmit data through the first link L1 of the pseudo-wire pw1 in accordance with the parameters defining the first communication session.

It is of course clear that during execution of the method of the invention the provider edge nodes PE1 and PE2 may interchangeably initiate sending of the first message requesting modification of a parameter of the pseudo-wire pw1.

Figure 7:
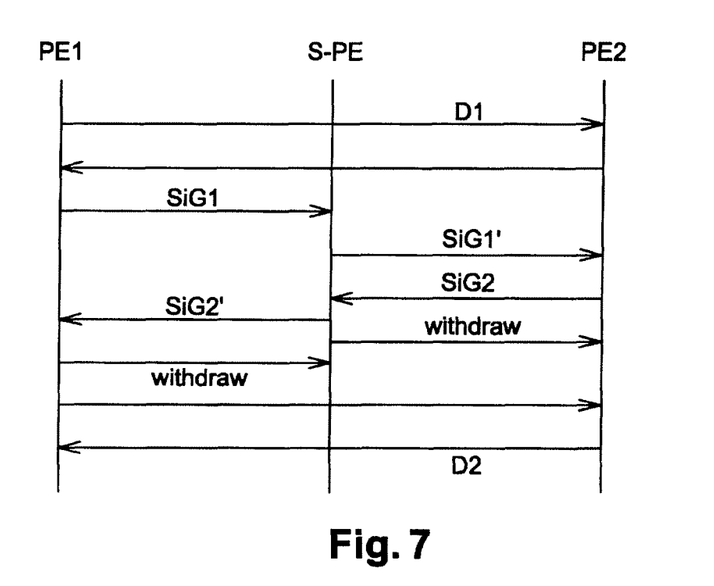
FIG. 7 is a timing diagram of messages exchanged between the first and second provider edge nodes using the method of the invention.

FIG. 7 represents the exchanges of messages between the provider edge node PE1 and the provider edge node PE2 during execution of the solution of the invention.

A data stream D1 is transmitted between the provider edge nodes PE1 and PE2 through the pseudo-wire pw1. This data stream includes data with payloads comprising 15 bits, for example, according to the parameters defining the first communication session set up through the pseudo-wire pw1.

If the format is modified in the provider edge node PE1, for example, it sends the router S-PE a first message SIG1 requesting to set up a second communication session through the pseudo-wire pw1 in order to transmit data from the provider edge node PE2 to the provider edge node PE1 in accordance with the invention, to the provider edge node PE2. A first message SIG1 of this kind includes parameters defining the second communication session used for the uplink direction.

The format modification effected in the provider edge node PE1 is an increase in the number of payload bits from 15 to 20, for example. Thus the message SIG1 requesting to set up a second communication session indicates that the new payload of the data transmitted in the uplink direction through the pseudo-wire pw1 is 20 bits.

As soon as the message SIG1 is received, the router is able to transmit data according to the parameters defining the second communication session. It suffices for this that it receives the authorization from the second provider edge node PE2.

The router in turn sends the second provider edge node PE2 a message SIG1' requesting setting up of the second communication session.

On reception of this message SIG1' requesting to set up the second communication session, the provider edge node PE2 is configured so that it is able to send data to the provider edge node PE1 through the pseudo-wire pw1 in accordance with the parameters defining the second communication session.

In response to the message SIG1', the second provider edge node PE2 sends the router a message SIG2 informing the router that the data transmitted to it by the second provider edge node PE2 now conforms to the parameters defining the second communication session. This message authorizes the router to delete from its switching table all the parameters defining the first communication session.

In response to the message SIG2, the router S-PE sends the second provider edge node PE2 a first message (Withdraw) to request deletion of the parameters defining the first communication session.

The router also sends a second message SIG2' informing the provider edge node PE1 that the data transmitted to it by the second provider edge node PE2 now conforms to the parameters defining the second communication session.

In response to the message SIG2', the provider edge node PE1 sends the router S-PE a second message requesting deletion of the parameters defining the first communication session.

Accordingly, after sending the first message SIG1 to the provider edge node PE2, the provider edge node PE1 is able to receive data encapsulated according to the old format, i.e. data blocks having a payload of 15 bits, as well as data conforming to the new format, i.e. data blocks having a payload of 20 bits. This remains true until the provider edge node PE1 sends the second deletion message. Once this deletion message has been sent, the first provider edge node PE1 can receive only data conforming to the parameters defining the second communication session.

Although the pseudo-wire pw1 was modified following the exchange of messages requesting setting up of a second communication session, and although it is able to transmit data having a payload of 20 bits, the customer edge node CE1 may continue for some time to generate data with a payload of 15 bits.

The pseudo-wire pw1 being able to transmit only data packets with a payload of 20 bits, the provider edge nodes PE1 and PE2 complete the payload with the aid of padding bits. Accordingly, if one of the client edge nodes CE1, CE2 generates data with a payload of 15 bits, the provider edge nodes PE1, PE2 sending the data add five padding bits before sending the data.

If the format modification consists in reducing the payload of the data, for example from 15 bits to 10 bits, it is necessary for the client edge nodes CE1, CE2 to generate data having a payload of 10 bits before executing the method of the invention. The pseudo-wire pw1 now being able to transmit only data packets with a payload of 15 bits, the provider edge nodes PE1 and PE2 complete the payload with the aid of padding bits. Accordingly, if one of the client edge nodes CE1, CE2 generates data with a payload of 10 bits, the provider edge nodes sending the data PE1, PE2 add five padding bits before sending the data until the pseudo-wire pw1 has been modified according to the invention.

Figure 8:
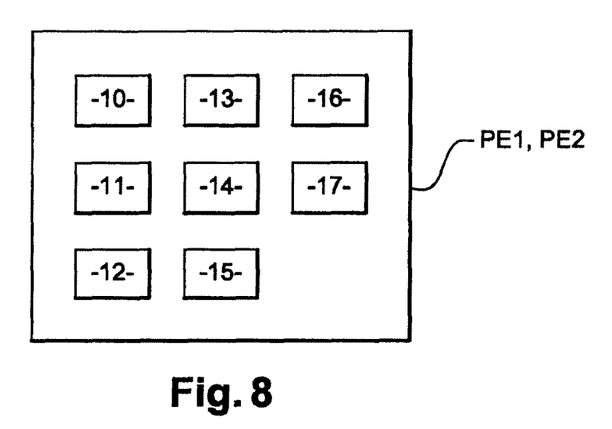
FIG. 8 represents a provider edge node adapted to use the communications method of the invention.

FIG. 8 represents a provider edge node PE1, PE2 adapted to execute the communications method of the invention.

A provider edge node PE1, PE2 of this kind includes means 10 for sending a message requesting to set up a communication session, means 11 for receiving the message requesting to set up a communication session, means 12 for setting up a communication session, and data transmission means 13.

The provider edge node PE1, PE2 of the invention also includes means 14 for transmitting a message requesting deletion of parameters defining a second communication session and means 15 for receiving the message requesting deletion of parameters defining a communication session.

Finally, the provider edge node PE1, PE2 of the invention also includes means 16 for sending a message indicating to the provider edge node that receives it that the data that is sent to it now conforms to the parameters defining the communication session set up. The provider edge nodes PE1, PE2 also include means 17 for receiving the message informing the provider edge node that receives it that the data transmitted to it now conforms to the parameters defining the communication session set up.

Figure 9:
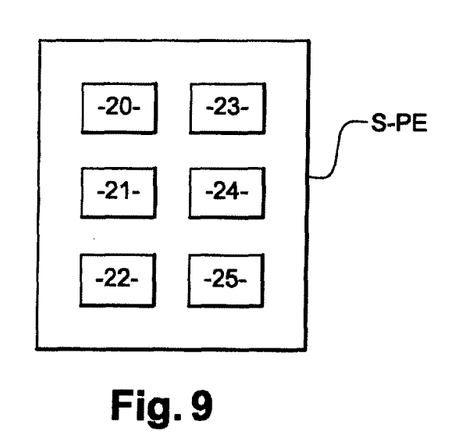
FIG. 9 represents a router adapted to implement the communications method of the invention.

FIG. 9 represents a router S-PE adapted to use the communications method of the invention.

A router S-PE of this kind includes means 20 for receiving messages requesting to set up a communication session and means 21 for sending messages requesting to set up a communication session.

The router also includes means 22 for sending messages requesting deletion of parameters defining a communication session and means 23 for receiving messages requesting deletion of parameters defining a communication session.

Finally, the router S-PE also includes means 24 for sending a message informing the equipment that receives it that the data that is sent to it now conforms to the parameters defining the communication session set up. The router also includes means 25 for receiving messages informing the equipment that receives it that the data transmitted to it now conforms to the parameters defining the communication session set up.

The invention further provides a computer program, notably a computer program on or in an information medium or memory, adapted to execute the first phase of the communications method of the invention.

This program may use any programming language and take the form of source code, object code, or a code intermediate between source code and object code, such as a partially-compiled form, or any other desirable form for implementing the broadcasting and receiving methods of the invention.

The information medium may be any entity or device capable of storing the programs. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed through an electrical or optical cable, by radio or by other means. The programs of the invention may in particular be downloaded over an Internet-type network.

The invention claimed is:

1. A communications method through a pseudo-wire set up between first and a second provider edge nodes of a packet-switched network, through at least one router of the packet-switched network and according to a label distribution protocol, a label being associated with a node and a data communication session, the first provider edge node being downstream of the router and the second provider edge node being upstream thereof, said method comprising, during a phase of transmission of data through the pseudo-wire in accordance with at least one label and first parameters defining a first data communication session set up through the pseudo-wire between the first and second provider edge nodes:
   receiving, by the second provider edge node, a set up message of a second data communication session through said pseudo-wire, the set-up message comprising a new label and second parameters defining the second data communication session;
   sending, by the second provider edge node, to the router, a notification message comprising the new label and the second parameters defining the second data communication session, the transmission of data continuing through said pseudo-wire in accordance with the second data communication session;
   after reception of the notification message comprising the new label and the second parameters defining the second data communication session,
   sending, by the router, an upstream neighbour equipment, or upstream equipment, a message requesting deletion of the at least one label and the first parameters defining the first data communication session; and
   sending, by the router, a downstream neighbour equipment, or downstream equipment, the notification message; and on reception of the notification message by the downstream equipment, configuring a switching table of the downstream equipment after which the at least one label and the first parameters defining the first data communication session are deleted from the switching table.

2. The communications method according to claim 1, further comprising, on reception by the upstream equipment of the message requesting deletion of the at least one label and the first parameters defining the first data communication session:
   configuring a switching table of the upstream equipment after which the at least one label and the first parameters defining the first data communication session are deleted from the switching table.

3. A provider edge node of a packet-switched network, a pseudo-wire being set up between a first provider edge node of the packet-switched network and said provider edge node, through at least one router of the packet-switched network, and according to a label distribution protocol, a label being associated with a node and a data communication session, said provider edge node comprising a transmitter for transmitting data through the pseudo-wire in accordance with at least one label and in accordance with first parameters defining a first data communication session set up through the pseudo-wire between the first provider edge node and the provider edge node, said provider edge node comprising:
   a receiver for receiving a set up message of a second data communication session through said pseudo-wire during a phase of transmission of data through the pseudo-wire in accordance with the at least one label and the first parameters between the first and second provider edge nodes, the set-up message comprising a new label and second parameters defining the second data communication session; and
   a transmitter for sending the router a notification message comprising the new label and the second parameters defining the second data communication session, the transmission of data continuing through said pseudo-wire in accordance with the second data communication session, wherein after reception of the notification message comprising the new label and the second parameters defining the second data communication session,
   the router sends an upstream neighbour equipment, or upstream equipment, a message requesting deletion of the at least one label and the first parameters defining the first data communication session;
   the router sends a downstream neighbour equipment, or downstream equipment, the notification message; and
   on reception of the notification message, the downstream equipment configures a switching table of the downstream equipment after which the at least one label and the first parameters defining the first data communication session are deleted from the switching table.

4. A router of a packet-switched network through which a pseudo-wire is established between a first provider edge node of a packet-switched network downstream of the router and a second provider edge node of the packet-switched network upstream thereof and according to a label distribution protocol, a label being associated with a node and a data communication session, data being transmitted through the pseudo-wire in accordance with at least one label and first parameters defining a first data communication session set up between the first and second provider edge nodes, the router comprising:
   a receiver for receiving a notification message comprising a new label and second parameters defining a second data communication session through said pseudo-wire during a phase of transmission of data through the pseudo-wire in accordance with the at least one label and the first parameters, the transmission of data continuing through said pseudo-wire in accordance with the second parameters defining the second data communication session;
   a transmitter for sending an upstream neighbour equipment a message requesting deletion of the at least one label and the first parameters defining the first data communication session during the phase of transmission of data through the pseudo-wire in accordance with the at least one label and the first parameters; and a transmitter for after reception of the notification message comprising the new label and the second parameters defining the second data communication session, the router sends an upstream neighbour equipment, or upstream equipment, a message requesting deletion of the at least one label and the first parameters defining the first data communication session;

the router sends a downstream neighbour equipment, or downstream equipment, the notification message; and on reception of the notification message, the downstream equipment configures a switching table of the downstream equipment after which the at least one label and the first parameters defining the first data communication session are deleted from the switching table.

5. A non-transitory computer program product comprising program code instructions for a processor to carry out a communications method through a pseudo-wire set up between a first and a second provider edge nodes of a packet-switched network through at least one router of the packet-switched network and according to a label distribution protocol, a label being associated with a node and a data communication session, said method comprising, during a phase of transmission of data through the pseudo-wire in accordance with at least one label and in accordance with first parameters defining a first data communication session set up between the first and second provider edge nodes:

receiving, by the second provider edge node, a set up message of a second data communication session through said pseudo-wire, the set-up message comprising a new label and second parameters defining the second data communication session; and sending, by the second provider edge node, to the router, a notification message comprising the new label and the second parameters defining the second data communication session, the transmission of data continuing through said pseudo-wire in accordance with the parameters defining the second data communication session;

after reception of the notification message comprising the new label and the second parameters defining the second data communication session, the router sends an upstream neighbour equipment, or upstream equipment, a message requesting deletion of the at least one label and the first parameters defining the first data communication session;

the router sends a downstream neighbour equipment, or downstream equipment, the notification message; and on reception of the notification message, the downstream equipment configures a switching table of the downstream equipment after which the at least one label and the first parameters defining the first data communication session are deleted from the switching table.

6. A method for producing a signal transmitted between first and second devices of a packet-switched network through which a pseudo-wire is established, data being transmitted through the pseudo-wire during a transmission phase in accordance with a label distribution protocol, a label being associated with a node and a data communication session, at least one label and first parameters defining a first data communication session, wherein said method for producing the signal comprises, during the transmission phase:

producing the signal that bears a notification message comprising a new label and second parameters defining a second data communication session set up between first and second provider edge nodes between which the pseudo-wire is set up, the transmission of data continuing through said pseudo-wire in accordance with the new label and the second parameters defining the second data communication session, after reception of the notification message comprising the new label and the second parameters defining the second data communication session, the router sends an upstream neighbour equipment, or upstream equipment, a message requesting deletion of the at least one label and the first parameters defining the first data communication session;

the router sends a downstream neighbour equipment, or downstream equipment, the notification message; and on reception of the notification message, the downstream equipment configures a switching table of the downstream equipment after which the at least one label and the first parameters defining the first data communication session are deleted from the switching table.

7. The method for producing the signal according to claim 6, further comprising:

providing an identifier of said pseudo-wire;

providing a parameter indicating that it is a notification message indicating switching of the transmission of data to the second data communication session;

providing a field including the second parameters defining the second data communication session; and providing the new label.

* * * * *